(No Model.)

J. WHEELOCK.
METALLIC RING PACKING.

No. 297,891. Patented Apr. 29, 1884.

Attest:
Philip F. Larner
Howell Bartle

Inventor:
Jerome Wheelock
By Wm. E. Wood
Attorney.

UNITED STATES PATENT OFFICE.

JEROME WHEELOCK, OF WORCESTER, MASSACHUSETTS.

METALLIC RING PACKING.

SPECIFICATION forming part of Letters Patent No. 297,891, dated April 29, 1884.

Application filed January 21, 1884. (No model.)

*To all whom it may concern:*

Be it known that I, JEROME WHEELOCK, of the city and county of Worcester, in the State of Massachusetts, have invented certain new and useful Improvements in Metallic Ring Packing; and I do hereby declare that the following specification, taken in connection with the drawings furnished and forming a part of the same, is a clear, true, and complete description of my invention.

My said improvements relate to that class of packing, whether for pistons or for rods, which involves the use of metal rings which are either expansive or contractile, as the case may be, and are backed up by springs, so as to force them against coincident surfaces for maintaining a good packing contact. Such rings are sometimes cut radially into two or more sections, and are sometimes cut only partially through in radial lines at several points, and wholly through at some one point.

The objects of my invention are to economically produce an effective and durable spring having a novel integral lug for securing it in position upon a ring, and, further, to so combine the two that said lug will "break joint" at the junction of any two sections of ring, and so as to cover or guard any whole or partial cut in any ring which may not, strictly speaking, be a sectional ring, although expansible and contractible.

Figure 1:
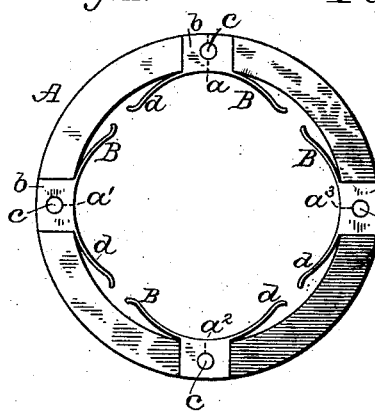
Figure 2:
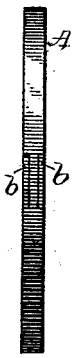
Figure 3:
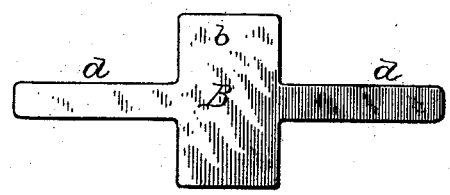
Figure 4:
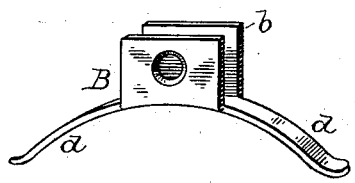
Figure 5:
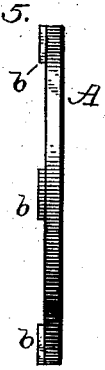
Figure 6:
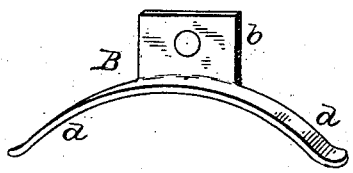
Figure 7:
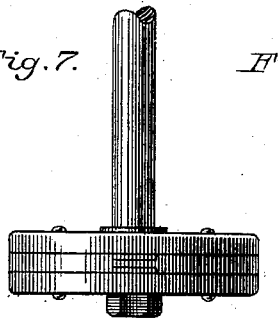
Figure 9:
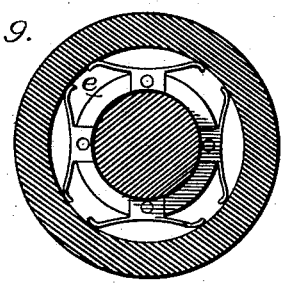
Figure 8:
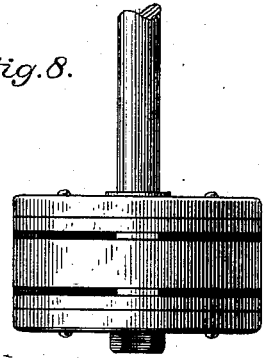
Figure 10:
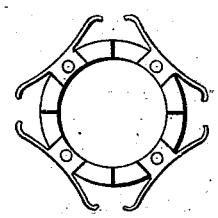

To particularly describe my invention I will refer to the accompanying drawings, in which Figure 1 is a side view of a packing-ring provided with springs in accordance with my invention, said ring being adapted for use on a piston. Fig. 2 is an edge view of the ring Fig. 1. Fig. 3 is a blank from which the spring as shown in Figs. 1 and 2 is formed. Fig. 4 is a perspective view of one of said springs detached. Fig. 5 is an edge view of a ring and its springs as constructed for use in a piston where two or more rings are desired. Fig. 6 is a perspective view of a spring as in the ring Fig. 5. Fig. 7 is a side view of a piston having a single ring like Fig. 1. Fig. 8 is a side view of a piston having two rings like Fig. 5. Fig. 9 is a vertical cross-section of a piston-rod gland containing rod-packing and springs in accordance with my invention. Fig. 10 is a side view of a sectional ring provided with my springs.

As seen in Fig. 1, the packing ring A is cut entirely through radially at $a$, and only partially through at $a'$ $a^2$ $a^3$, these latter cuts entering from the interior of the ring. This ring, being adapted for use singly in a piston having a single groove, would be varied in thickness according to circumstances, and it is to be understood that it may be made in three or more sections without departure from my invention. At each of the points where the cuts are made the ring is transversely bored, and at each side of said ring, adjacent to said cuts, a recess is milled for the flush reception of the lugs $b$ of the spring B, so that when said lugs are firmly secured to the ring by a transverse countersunk rivet, $c$, the joints in the ring are well covered, and the outer surfaces of said lugs, on each side, are flush with the outer or side surfaces of the ring. The lugs $b$ of the spring project at right angles from and are integral with its suitable curved arms, $d$, the whole being preferably formed from a flat blank cut from suitable sheet metal, as illustrated in Fig. 3. The spring-arms $d$ may be graduated in thickness, if desired, and they should have their outer ends curved to afford good bearing-points upon the bottom of the groove in which the ring is located. When a single ring of this variety is mounted in a groove upon a piston, it will be seen that both of its sides will engage in close contact with the coincident surfaces of the piston-groove, as shown in Fig. 7; and it will be obvious that, if desired, such rings may be employed with a piston having more than one groove, each of the latter being provided with a single ring. I prefer, however, when more than one ring is desired in a piston, to employ in each groove thereof a ring which, with the single lug $b$ of the spring applied flatwise to its side surface, will properly fill the groove from side to side. For such rings as are shown in Figs. 5 and 6 I make my spring with but one lug $b$, which, as before described, is integral with the arms $d$, and is formed from a blank similar to that shown in Fig. 3, but having, of course, only one sidewise projection for forming the single lug.

It will be seen that my rings and springs can be equally well employed with grooved junk-rings or T-rings, or with pistons otherwise provided with annular grooves.

In piston-rod packing it is obvious that springs of substantially the same character are employed; but, as shown in Fig. 9, they are reversed in position, the arms being applied to the outside of the ring-packing e, instead of to the inside, as before described.

Although the prime value of my spring with integral lug accrues when employed, as described, for breaking joints between the sections of the rings and at whole or partial cuts therein, said spring has also value when located centrally, or between the ends of such sections, or between said cuts in a ring, as shown in Fig. 10, because said spring can be economically produced, and can be applied firmly to a ring, however thin the latter may be, without in any manner weakening said spring; and therefore I do not limit myself to such a combination of the springs and rings as will cause the lugs of said springs to break joint, as described.

It will of course be understood that my invention pertains in no manner to any particular variety of piston or piston-rod gland, it being obvious that if they are adapted to the use of metallic ring packing my improvements may be profitably employed therewith.

Having thus described my invention, I claim as new and desire to secure by Letters Patent—

1. The combination, with an expansible or contractile packing-ring, of springs having one or more integral lugs projecting from the edge of the spring and at right angles therefrom, substantially as described, whereby said springs may be secured to one or both sides of said rings by transverse rivets through the lug or lugs of the spring and the ring, as set forth.

2. The combination, with expansible or contractile metallic packing-rings, of springs having integral lugs secured to one or both sides of said rings and overlapping or breaking the joints therein, substantially as described.

JEROME WHEELOCK.

Witnesses:
HENRY A. WINN,
J. A. HOWARTH.